United States Patent [19]

Matsuo et al.

[11] Patent Number: 4,725,460
[45] Date of Patent: Feb. 16, 1988

[54] OPTICAL FILTER AND THE METHOD OF PREPARING THE SAME

[75] Inventors: Yoshihiro Matsuo, Neyagawa; Shoichi Ishihara, Katano; Kazuhisa Morimoto, Settsu; Seiichi Nagata, Sakai; Tetsu Ogawa, Otokuni, all of Japan

[73] Assignee: Matsushita Electric Industrial Co., Ltd., Osaka, Japan

[21] Appl. No.: 711,012

[22] Filed: Mar. 12, 1985

[30] Foreign Application Priority Data

Mar. 12, 1984 [JP] Japan .................................. 59-47401
Aug. 8, 1984 [JP] Japan .................................. 59-165927

[51] Int. Cl.$^4$ .......................... B29D 7/24; C08G 5/18
[52] U.S. Cl. ...................................... 428/1; 156/308.2; 156/309.9; 428/212; 428/910
[58] Field of Search ...................... 428/1, 910, 212; 156/308.2, 309.9

[56] References Cited

U.S. PATENT DOCUMENTS 4,384,016 5/1983 Ide et al. .................................. 428/1

Primary Examiner—Marion C. McCamish
Attorney, Agent, or Firm—Wenderoth, Lind & Ponack

[57] ABSTRACT

This invention provides an optical filter comprises of a pair of solid polymer films, wherein (1) a first solid polymer film has a planar alignment of a cholesteric liquid crystal structure of either clockwise or counterclockwise helical structure, which alignment allows the light of a specified wavelength to be scattered selectively, and (2) a second solid polymer film has a planar alignment of a cholesteric liquid crystal structure of a helical structure whose helical direction is the opposite to that of the first solid polymer film, which alignment allows the light at the specified wavelength to be scattered selectively, wherein the optical axes of the first and second solid polymer films are made substantially parallel to each other.

This invention also provides preparation methods of an optical filter mentioned above.

21 Claims, 4 Drawing Figures

OPTICAL FILTER AND THE METHOD OF PREPARING THE SAME

BACKGROUND OF THE INVENTION

The present invention relates to an optical filter which can be applied, for example, to a color display, and to the method of preparing the same.

PRIOR ART

A red (R) filter, a green (G) filter and a blue (B) filter, which pass only red light, green light and blue light, respectively, are used in general in apparatuses such as a color display. For example, a filter used for a full color display is constructed by arranging a large number of pixels, and each pixel consists of very small R, G, and B filters. In such a filter, it is desirable that the optical wavelength ranges of the R, G, and B filters do not superpose with each other in order to widen the reproduction region of light in the CIE chromaticity diagram. However, as shown in FIG. 1, the optical wavelength regions of real R, G, and B filters superposes with each other. Then, a light notch filter is needed which can reflect (hereinafter, the term "reflect" means "not transmit", that is, it embraces not only "reflect" but also "absorb") the light in the superposing wavelength region of R and G filters, the light in the other superposing wavelength region of G and B filters, and the noise light from the source of light.

It has been well known that a cholesteric liquid crystal has optical properties such as selective scattering of light, optical rotation and circular dichroism. The application of the optical properties of a cholesteric liquid crystal to a light notch filter has been disclosed in U.S. Pat. No. 3,669,525 (June 13, 1972) and U.S. Pat. No. 3,679,290 (July 25, 1972) wherein a pair of liquid crystal films composed of a dextrorotary cholesteric liquid film and a levorotary one reflects the light in a specified wavelength region but transmits the light outside the region.

A cholesteric liquid crystal film mentioned above has a cholestric liquid crystal phase structure near room temperature. It can be produced by following steps: A cholesteric liquid crystal composition is dissolved once in an organic solvent such as chloroform and petroleum ether; after the solution is extended in a film, it is heated above the transition temperature about 60° C. from the cholesteric phase to the isotropic phase; as the solvent component is evaporated, the cholesteric liquid crystal component can be combined directly.

As mentioned above, a cholesteric liquid crystal film has following disadvantages which prevent it to be used practically as a stable light notch filter. First, the pitch of rotation of a cholesteric liquid crystal film varies essentially according to external variables such as temperature, pressure, electric field, magnetic field, chemical vapor and ultraviolet rays. Therefore, in order to use practically a cholesteric liquid crystal film it should be installed in a thermostat at a constant temperature. Furthermore, it should be covered with a protection film such as a glass plate and a Mylar ® sheet in order to protect it from chemical vapor such as moisture and alcohol in the air. Because the cholesteric liquid crystal film is usually a viscous glassy film or a liquid film, it is viscous and soft. Then it should also be covered with a protection film against foreign substances such as dust and worms.

Second, a transparent spacer is needed between a pair of cholesteric liquid crystal films when a light notch filter is composed of a dextrorotary cholesteric liquid crystal film and a levorotary cholesteric liquid crystal film. The transparent spacer brings about the reflection loss and the absorption loss of light so that the transmittance of the light outside a specified wavelength range of the notch filter becomes lower.

On the other hand, a technique of producing a solid polymer film was disclosed in a Japanese patent laid open publication No. 139506/1981. The solid polymer film is produced by using a polymerization process of lyotropic liquid crystal made of mixed solution of cholesteric liquid crystal components and monomers having unsaturated radicals. The solid polymer film has a fixed cholesteric liquid crystal structure, whose helical pitch is very stable against external variables such as temperature, electric field, magnetic field and light. This invention of a composite of cholesteric liquid crystal and polymer has disclosed a way of using practically a passive optical element which makes use of optical properties of cholesteric liquid crystal.

However, there has not been disclosed in the reference a technique necessary to produce a light notch filter, that is, a technique of layering at least one pair of cholesteric liquid crystal films so that their optical axes become parallel to each other, especially, a technique of applying a pair of cholesteric liquid crystal films in close contact with each other.

SUMMARY OF THE INVENTION

An object of the present invention is to provide a stable optical filter which acts as an excellent light notch filter, and a method of preparing the same.

An optical filter is provided herein comprising a pair of (1) a first solid polymer film having a planar alignment of a cholesteric liquid crystal structure of either clockwise or counterclockwise helical structure, which alignment allows the light of a specified wavelength to be scattered selectively, and (2) a second solid polymer film having a planar alignment of a cholesteric liquid crystal structure of a helical structure whose helical direction is the opposite to that of the first solid polymer film, which alignment allows the light at the specified wavelength to be scattered selectively; wherein the optical axes of the first and second solid polymer films are made substantially parallel to each other.

When the optical filter is irradiated with the white light, the right and left components of the circular polarization of the specified wavelength of the white light are reflected by one of the solid polymer films, that is, the dextrorotary cholesteric liquid crystal film layer, and by the other of the solid polymer films, that is, the levorotary cholesteric liquid crystal film layer, respectively. Thus, an advantage of the present invention is to reflect the light of a specified wavelength substantially completely.

Furthermore, both solid polymer films are layered directly, and the average refractive indexes of both solid polymer films can be made equal to each other easily. Then, the reflection loss of the light due to the transmittion of the light notch filter does not arise, and the transmittance of the light at wavelengths except the specified wavelength is very large. Thus, another advantage of an optical filter according to the present invention is to transmit the light at wavelengths except the specified wavelength substantially completely.

A preparation method of an optical filter according to the present invention comprises of (1) a step of placing a first lyotropic liquid crystal of the cholesteric phase in the planar alignment between two parallel substrates in a uniform thickness, which lyotropic liquid crystal is made of a first mixed solution of polypeptide compounds and monomers which is allowed to polymerize under radiation, which cholesteric phase has an either clockwise or counterclockwise helical structure; (2) a step of fixing the planar alignment by the radiation polymerization at a predetermined temperature so that a first solid polymer film is produced; (3) a step of placing a second lyotropic liquid crystal between the first solid polymer film and a substrate placed parallel to the first solid polymer film in a uniform thickness of cholesteric phase in the planar alignment, which lyotropic liquid crystal is a second mixed solution of polypeptide compounds and monomers which can polymerize under radiation, which cholesteric phase has a helical structure whose helical direction is the opposite to that in the first solid polymer film; and (4) a process of fixing the planar alignment by the radiation polymerization at a predetermined temperature so that a second solid polymer film is produced; wherein the components and their concentrations in the first and second mixed solutions and the polymerization temperature are determined so that the product of the refractive index and the helical pitch of the cholesteric phase in the first solid polymer film is equal to that in the second solid polymer films are made substantially parallel to each other.

Another preparation method of an optical filter according to the present invention comprises of (1) a step of placing lyotropic liquid crystal of a uniform thickness in the cholesteric phase in the planar alignment on a substrate; which lyotropic liquid crystal is made of a first mixed solution of polypeptide compounds and monomers which can polymerize under radiation, which cholesteric phase has either clockwise or conterclockwise helical structure; (2) a step of fixing the planar alignment by the radiation polymerization at a predetermined temperature so that a first solid polymer film is produced; (3) a step of placing lyotropic liquid crystal in a uniform thickness in the cholesteric phase on the surface of the first solid polymer film; which lyotropic liquid crystal is made of a second mixed solution of polypeptide compounds and monomers which can polymerize under radiation, which cholesteric phase has a helical structure whose helical direction is the opposite to that of the second solid polymer film; and (4) a step of fixing the planar alignment by the radiation polymerization at a predetermined temperature so that a second solid polymer film is produced; wherein the components and their concentrations in the first and second mixed solutions and the polymerization temperature are determined so that the product of the refractive index and the helical pitch of the cholesteric phase in the first solid polymer film is equal to that in the second solid polymer film.

The radiation polymerzation includes photopolymerization such as the visible light polymerization, ultraviolet rays polymerization, and electronic rays polymerization.

If the chemical composition of the mixed solutions of polypeptide compounds and monomers is determined, the helical pitch of a cholesteric liquid crystal relevant to the selective scattering of the light at the specified wavelength is governed by the temperature of the mixed solutions on the radiation polymerization. Therefore, it is needed to keep the cholesteric liquid crystal in the mixed solution at a constant temperature till the end of the process of the radiation polymerization. After the completion of the polymerization, the helical pitch of the cholesteric liquid crystal is fixed with the three dimensional network of the resultant polymer. Thus, the helical pitch keeps the magnitude determined at the radiation polymerization, and it is affected little by the ambient temperature.

An advantage of the preparation methods of an optical filter is that the wavelength range of the light to be reflected with an optical filter can be selected freely, and that the width of the wavelength range can be controlled.

A further advantage of the preparation method of an optical filter is to provide an optical filter integrated with a substrate which can also be used for another purpose.

BRIEF DESCRIPTION OF DRAWINGS

Embodiments of the invention will now be described by way of examples and with reference to the accompanying drawings in which.

DETAILED DESCRIPTION OF THE INVENTION

Figure 2:
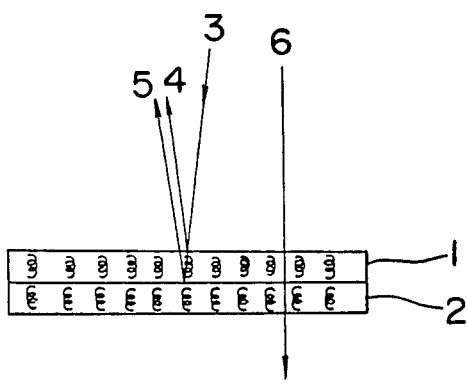
FIG. 2 is a cross-sectional view of a structure of an optical filter according to the invention.

FIG. 2 shows a light notch filter of an embodiment according to the invention. This light notch filter can reflect the incident light in a single wavelength range. A dextrorotary liquid crystal film 1 is a solid polymer film wherein cholesteric liquid crystal of the dextrorotary structure is fixed. The helical axis of the cholesteric liquid crystal aligns perpendicular to the surface of the film 1. A levorotary liquid crystal film 2 is applied directly on the dextrorotary liquid crystal film 1. The levorotary liquid crystal film 2 is a solid polymer film wherein cholesteric liquid crystal of the levorotary structure is fixed, and the helical axis of the cholesteric liquid crystal aligns perpendicular to the surface of the film 2.

If the abovementioned light notch filter is irradiated with the white light substantially perpendicularly to the surface of the film 1, only the right circularly polarized component 4 of a specified wavelength $\lambda_0$ of the white incident light is reflected by the dextrorotary liquid crystal film 1. Next, only the left circularly polarized component 5 of the specified wavelength $\lambda_0$ of the light which is transmitted through the film 1 is reflected by the levorotary liquid crystal film 2, and is transmitted through the film 1. Thus, the optical filter according to the present invention reflects only the lights 4, 5 of the specified wavelength $\lambda_0$ of the incident white light 3, whereas it transmitts the light of wavelengths except $\lambda_0$ through the films 1, 2. In other words, the optical filter acts as a light notch filter which reflects only the light of a specified wavelength $\lambda_0$.

The wavelength of the light reflected with the optical filter (light notch filter) has essentially a width $\Delta\lambda$ around the peak wavelength $\lambda_0$, wherein $\lambda_0 = p \cdot n$ and $\Delta\lambda = 2p \cdot \Delta n/\pi$ (if the thickness of the filter is sufficiently thick) wherein p denotes the helical pitch of the cholesteric liquid crystal, n the average refractive index, and $\Delta n$ the double refraction. If the incident light enters the optical filter in the direction which deviates by an angle $\theta$ from the direction perpendicular to the surface of the film 1, $\lambda_0 = p \cdot n \cos \theta$. In reality, $\lambda_0$ distributes optically because of the distribution of properties such as the degree of the alignment of the helical axis of the cholesteric liquid crystal, the degree of the distortion of the helix, and the helical pitch. The width of the distribution of $\lambda_0$ can be limited by controlling both the degree of the alignment of the helical axis of the cholesteric liquid crystal (for example, in the direction perpendicular to the surface of the film) and the width of the distribution of the heical pitch. It is important in the structure of an optical filter according to the invention that the condition $p_r n_r = p_1 \cdot n_1$ should be satisfied surely wherein $p_r$ and $n_r$ denote the helical pitch and the average refractive index of the dextrorotary cholesteric liquid crystal, respectively, and $p_1$ and $n_1$ denote the helical pitch and the average refractive index of the levorotary cholesteric liquid crystal, respectively. Furthermore, the condition $n_r = n_1$ (then, $p_r = p_1$) should be satisfied preferably in order to eliminate the loss due to the reflection on the transmission of the light having wavelengths other than the specified wavelength $\lambda_0$ through the optical filter. The average refractive index can be controlled by the preparation of the chemical compositions of liquid crystal solution, while the magnitude of the helical pitch can be controlled by keeping the solution on the radiation polymerization at an appropriate temperature.

A typical example of the production process of a polymer film according to the invention is as follows: First, both polypeptide compounds and monomers are mixed sufficiently to form a lyotropic liquid crystal. The polypeptide compounds are liquid crystal materials and the monomers are solvents having unsaturated radicals which can polymerize under radiation. The concentration of the solution is controlled so as to become a cholesteric liquid crystal solution (in the lyotropic liquid crystal state). Then, the temperature of the solution can be controlled so that the helical pitch has a predetermined value, and the radiation polymerization are allowed to occur while the solution is kept at the predetermined temperature. Thus, a solid polymer film can be prepared wherein the cholesteric liquid crystal is fixed.

Not only the helical pitch p of the cholesteric liquid crystal in a solid polymer film can be controlled easily but also the direction of the helix (right and left) of the cholesteric liquid crystal can be converted by selecting the kinds of the polypeptide compounds and the monomers, by changing the composition of the cholesteric liquid crystal solution and by controlling the temperature on the radiation polymerization.

Then, in the process of producing a solid polymer film 1 wherein the dextrorotary cholesteric liquid crystal is fixed, the product $p_r n_r$ is controlled so as to equal a specified wavelength $\lambda_0$ to be reflected in the visible range. Next, in the process of producing a solid polymer film 2, which will be applied on the polymer film 1 directly wherein the levorotary cholesteric liquid crystal is fixed, the product $p_1 n_1$ is controlled so as to equal the specified wavelength $\lambda_0$ (preferably so as to satisfy $p_1 = p_r$ and $n_1 = n_r$). Thus, a layered film consisting of a pair of solid polymer films can be prepared and it acts excellently as a light notch filter.

Another important point for a light notch filter is that it is necessary to align the helical axes (the optical axes) of each part of cholesteric liquid crystal fixed in the solid polymer film and to make the directions of the helical axis of dextrorotary cholesteric liquid crystal and that of levorotary cholesteric liquid crystal to be parallel to each other and to be perpendicular to the surface of the solid polymer film. In general, cholesteric liquid crystal can have planer alignment wherein the helical axes align perpendicular to the surface of the glass plate by putting cholesteric liquid crystal solution in the lyotropic liquid crystal state between both glass plates having a clear surface or having a surface subjected to the alignment treatment. On the other hand, if cholesteric liquid crystal solution is painted on the surface of a solid polymer film wherein the cholesteric liquid crystal has already been fixed in the planer alingnment, the helical axis of the cholesteric liquid crystal in the solution tends to align substantially perpendicularly to the surface of the solid polymer film irrespectively of the direction of the helical axis. Therefore, it is easy to layer a pair of solid polymer films which have fixed dextrorotary and levorotary helical structure of cholesteric liquid crystal. This is one of the characteristics of the present invention.

An optical filter according to the present invention can also be constructed with two pairs of polymer films as follows. A pair of solid polymer films which scatters selectively the light of a specified wavelength $\lambda_0$ is constructed with a process mentioned above with a solid polymer film containing dextrorotary cholesteric liquid crystal of helical pitch $p_r$ and the refractive index $n_r$ and another polymer film containing levorotary cholesteric liquid crystal of helical pitch $p_1$ and the refractive index $n_1$. Then, another pair of polymer film layers which scatters selectively the light of another specified wavelength $\lambda_0'$ is applied on the abovementioned pair of solid polymer films so that the optical axes of the films are parallel to each other. The another pair of solid polymer films is constructed with a process mentioned above with a solid polymer film containing dextrorotary cholesteric liquid crystal of helical pitch $p_r'$ and the refractive index $n_r'$ and another solid polymer film containing levorotary cholesteric liquid crystal of helical pitch $p_1'$ and the refractive index $n_1'$. When the white incident light enters parallel to the helical axes of cholesteric liquid crystal which have aligned perpendicularly to the surface of each film, the materials for the four solid layers should be selected so as to satisfy following relations $\lambda_0 = p_r \cdot n_r = p_1 \cdot n_1$ and $\lambda_0' = p_r' \cdot n_r' = p_1' \cdot n_1'$ ($\lambda_0 \neq \lambda_0'$). If the abovementioned four film is irradiated with the white incident light, only the light of a specified wavelengths $\lambda_0$ and $\lambda_0'$ is scattered selectively, whereas the light of the other wavelengths is all transmitted through the four films. That is, the abovementioned type of an optical filter acts as a multinotch filter which can reflect the light of two wavelengths $\lambda_0$ and $\lambda_0'$ at the same time. Furthermore, it is desirable that the components of the mixed solutions are controlled so as to satisfy the condition $n_r = n_1 = n_r' = n_1'$.

Similarly, a multinotch filter which reflects the light of a plurality of predetermined desired wavelength can be constructed by increasing the number of a pair of solid film layers each pair of which reflects the light of a wavelength different from each other, wherein each pair is constructed as mentioned above with cholesteric liquid crystal films having dextrorotary helical pitch $p_r$ and dextrorotary helical pitch $p_1$ each corresponds to the predetermined wavelength of the light to be reflected.

An optical filter according to the present invention can be integrated with a substrate of one or more kinds of film or plate such as transparent film (transparent organic protection film, transparent organic alignment film, transparent electrode etc.), transparent plate (glass plate etc.), color filter, polarizing plate (linearly polarized plate, circularly polarizable plate), color polarizing plate, quarter-wave plate and half-wave plate. In general, in a display such as liquid crystal display, electrochromic display, electroluminescence display and cathode ray tube display, such a film or a plate has been used according to the respective requirements. In a production process of a cholesteric liquid crystal polymer film, a film or a plate such as mentioned above can be layered and be integrated at the same time so that the working efficiency can be improved and the production cost can be lowered. It is also possible to improve the moisture resistance, the light resistance and the gas resistance by applying a transparent protection film on the surface of an optical filter film according to the present invention.

Any material which can become the cholesteric liquid crystal in the lyotropic liquid crystal state can be used as liquid crystal material for an optical filter according to the present invention. The solvent which should be used in an optical filter according to the present invention is a monomer having one or more unsaturated radicals which allows the polymerization under radiation. Polymers, especially polymers having polypeptide combinations (that is, rod-like molecules having a helical structure) are known to become easily a stable cholesteric liquid crystal compound, polymers of acidic amino acid and its ester derivatives can keep the cholesteric liquid structure very stably after fixed in a solid polymer film by polymerizing the monomers under radiation. Three kinds of such acidic amino acids are as follows: asparagic acid, glutamic acid, and oxyglutamic acid. On the other hand, such ester derivatives of an amino acid are as follows; methyl ester, ethyl ester, propyl ester, butyl ester, pentyl ester, hexyl ester, cyclohexyl ester, benzyl ester and chlorobenzyl ester of an acidic amino acid. Amino acid polymers and amino acid derivative polymers obtained by polymerizing such an acidic amino acid or a derivative thereof are used as a liquid crystal material for an optical filter according to the present invention.

An acrylic compound, an methacrylic compound or an allyl compound having at least one unsaturated radical can be used as the monomer which can polymerize under radiation. For example, an acrylic or a methacrylic compound may be aliphatic polyols, poly-(meth-)acrylate, an ester of (meth-)acrylic acid with alkylene oxide, an ester of (meth-)acrylic acid with polyols produced by adding alkylene oxide to a phenol, a (meth-)acrylate of cyclopentadiene and di-(meth-)acrylates of bisphenol A and an addition compound of ethylene oxide. Polyethylene glycol dimethacrylates such as triethylene dimethacrylate and tetraethylene glycol dimethacrylate are preferable because of the low viscosity and the easiness of the radiation polymerization. If ultraviolet rays are used on the radiation polymerization, benzophenone or benzoine compounds can be added as a photosensitizer, and acetophenone compounds can be added as a polymrization initiator.

EXAMPLE 1

50 wt. % of poly-L-glutamic acid n-butylester used as liquid crystal material and 50 wt. % of triethylene glycol methacrylate used as solvent and monomer for radiation polymerization at the same time are each weighed. Both are stirred and mixed sufficiently by keeping between 40° and 50° C., and then 1 wt. % of benzophenone as photosensitizer is added to the homogenous liquid crystal solution thus obtained. The mixed solution A thus prepared is placed between two clean glass plates, and is kept at a constant temperature 30° C. Then, the monomers are polymerized for five hours under radiation of ultraviolet rays with a mercury lamp applied with very high voltage. Then, a solid polymer film of thickness 0.2 mm is obtained, and the cholesteric liquid crystal has been fixed in the solid polymer film.

Optical measurements of only this solid polymer film show strong selective reflection (the reflectivity 45%) around the central wavelength 490 nm of the incident light of right circular polarization.

Next, 50 wt. % of poly-D-glutamic acid n-butylester (its molecular weight is about 70,000 as that of the counterpart, poly-L-glutamic acid n-butylester) as liquid crystal material and 50 wt. % of triethylene glycol methacrylate used as solvent and monomer for radiation polymerization at the same time are each weighted. Both are stirred and mixed sufficiently by keeping between 40° and 50° C., and then 1 wt. % of benzophenone as photosensitizer is added to the homogeneous liquid crystal solution thus obtained. The mixed solution B thus prepared is placed between the dextrorotary liquid crystal polymer film mentioned above and a glass plate, and is kept at a constant temperature 30° C. Then, the monomers are polymerized for five hours under radiation of ultraviolet rays with a mercury lamp applied with very high voltage. Then, another solid polymer film of thickness 0.2 mm is obtained on the above-mentioned polymer film, and the cholesteric liquid crystal has been fixed in the solid polymer film. Thus, a layered film of double layers is produced.

Optical measurements of only this solid polymer film show strong selective reflection (the reflectivity 45%) around the central wavelength 490 nm of the incident light of left circular polarization.

Optical measurements of the layered film consisting of a pair of solid polymer films show strong selective reflection (the reflectivity 90%) around the peak wavelength 490 nm of the incident light of both right and left circular polarizations. That is, the layered film as a light notch filter reflects substantially all the light around a specified wavelength 490±15 nm (90%) and can transmit substantially all the light at wavelengths except 490±15 nm (88%).

EXAMPLE 2

A layered film of four layers is produced by placing other polymer films on the layered film produced in Example 1.

First, the mixed solution A prepared in Example 1 is placed between the layer film produced in Example 1 and a glass plate, and is kept at a constant temperature 43° C. Then, the monomers contained in the mixed solution A are polymerized for five hours under radiation of ultraviolet rays from a mercury lamp applied with a very high voltage. Thus, a third solid polymer film of thickness 0.2 mm wherein the cholesteric liquid crystal has been fixed is layered anew on the layered film of Example 1 so that a layered film of three layers is produced.

The optical measurements of only the third polymer film show strong selective reflection (the reflectivity 43%) around the peak wavelength 580 nm of the incident light of right circular polarization.

Next, the mixed solution B prepared in Example 1 is placed between the layer film of three layers prepared above and a glass plate, and is kept at a constant temperature 43° C. Then, the monomers contained in the mixed solution B are polymerized for five hours under radiation of ultraviolet rays from a mercury lamp applied with a very high voltage. Thus, a fourth solid polymer film of thickness 0.2 mm wherein the cholesteric liquid crystal has been fixed is layered anew on the layered film of three layers.

The optical measurements of only the fourth polymer film show strong selective reflection (the reflectivity 44%) around the peak wavelength 580 nm of the incident light of left circular polarization.

Figure 3:
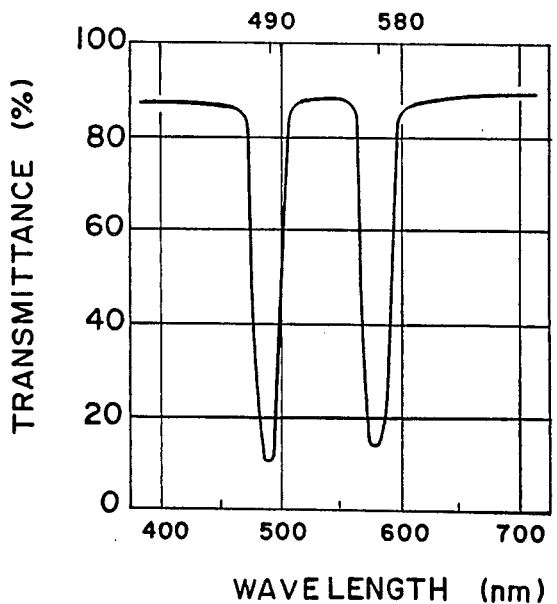
FIG. 3 and FIG. 4 are each a graph of optical characteristics of an optical filter according to the invention.

FIG. 3 shows the optical data of the abovementioned layered film of four layers. It is found that strong selective reflection of the incident light of both right and left circular polarizations occurs at two ranges around the peak wavelengths 490 nm and 580 nm wherein the reflectivity are 90% and 87%, respectively.

In other words, the layered film of four layers can be used as an optical filter which can act as a light notch filter to reflect the light in the visible range both around a specified wavelength 490±15 nm and around 580±15 nm at the same thim and can transmit substantially all the light at wavelengths except the specified wavelengths (87%).

Figure 1:
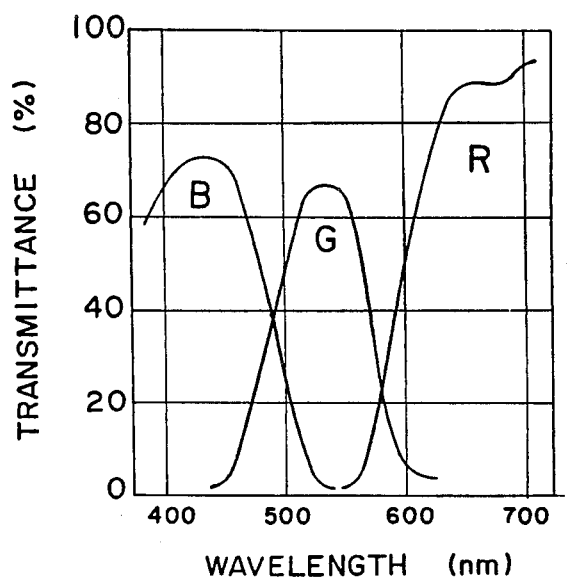
FIG. 1 is a graph of the optical characteristics of a mosaic color filter of three primary colors (R: red, G: green, and B: Blue) used in a color display in general.

Next, a full color picture display of a liquid crystal cell equipped with a three primary color mosaic filter which have optical characteristics shown in FIG. 1 is tested in two cases that a light notch filter having the spectral characteristics shown in FIG. 3 is either inserted or not between the source of white light and the color filter. The region of the reproduction of color increases by about 12% in the area in the CIE chromaticity diagram by using the light notch filter according to the present invention.

EXAMPLE 3

After forming a polyimide film treated for horizontal alignment on a transparent glass substrate, the same mixed solution A as prepared in Example 1 is painted in a uniform thickness with a spinner on the polyimide film. Then, by keeping at a constant temperature 30° C., the painted layer is irradiated with the ultraviolet rays for one hour so as to polymerize the monomers contained in the mixed solution A. Thus, a dextrorotary cholesteric liquid crystal polymer film of thickness 20 μm is produced, integrated with the glass substrate. Next, the same mixed solution B as prepared in Example 1 is painted in a uniform thickness on the abovementioned polymer film. Then, by keeping at a constant temperature 30° C., the painted layer is irradiated with the ultraviolet rays for one hour so as to polymerize the monomers contained in the mixed solution B. Thus, a levorotary cholesteric liquid crystal polymer film of thickness 20 μm is layered on the abovementioned polymer film. Next, the same mixed solution A as prepared in Example 1 is painted in a uniform thickness on the polymer film obtained above. By keeping at a constant temperature 43° C., the painted layer is irradiated with the ultraviolet rays for one hour so as to polymerize the monomers contained in the mixed solution A. Thus, a dextrorotary cholesteric liquid crystal polymer film of thickness 20 μm is layered on the layered film of two layers. Finally, the same mixed solution B as prepared in Example 1 is painted in a uniform thickness on the polymer film obtained above. By keeping at a constant temperature 43° C., the painted layer is irradiated with the ultraviolet rays for one hour so as to polymerize the monomers contained in the mixed solution B. Thus, a levorotary cholesteric liquid crystal polymer film of thickness 20 μm is layered on the layered film of three layers. That is, an optical filter according to the present invention is produced by layering four polymer films and by integrating the glass substrate with them at the same time.

Figure 4:
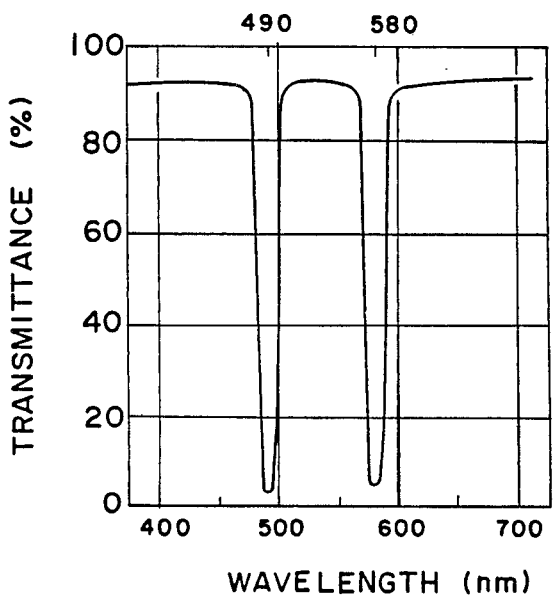

FIG. 4 shows the spectral characteristics of the optical filter obtained above. The optical filter can reflect the light in the visible range both at a specified wavelength 490±10 nm and at another specified wavelength 580±10 nm at the same time substantially completely (the reflectivity at both wavelengths are 98% and 96%, respectively), whereas it can transmit substantially all the light at wavelengths except the specified wavelengths (93%). Because the optical filter is integrated with a transparent glass substrate, it can be used, for example, as a substrate of a liquid crystal cell at the same time.

The multinotch filter of Example 3 has sharper reflection peaks at the specified wavelengths than that of Example 2. In other words, the half-widths of the reflection peaks become smaller, and the heights of the reflection peak become higher. This is ascribable to the narrowing of the distribution of the alignment of the helical axis of each cholesteric liquid crystal fixed in the solid polymer films.

EXAMPLE 4

The same mixed solution A as prepared in Example 1 is held between two clean glass plates with a spacer between them. After kept at a constant temperature 30° C. for twelve hours, the mixed solution A between the glass plates is subjected to radiation for subsequent five hours of ultraviolet rays from a mercury lamp applied with a very high voltage so as to polymerize the monomers contained in the mixed solution A. Thus, a polymer film of thickness 0.2 mm is obtained wherein the dextrorotary cholesteric liquid crystal is fixed.

Optical measurements on this polymer film show strong selective reflection (the reflectivity 45%) at the central wavelength of 490 nm and the reflection of the light of right circular polarization. The half-width of the reflection peak is 28 nm.

On the other hand, the same mixed solution A as prepared in Example 1 is held between two clean glass plates with a spacer between them. After kept at a constant temperature 30° C. for twelve hours, the mixed solution B between the glass plates is subjected to radiation for subsequent five hours of ultraviolet rays so as to polymerize the monomers contained in the mixed solution B. Thus, a polymer film of thickness 0.2 mm is obtained wherein the levorotary cholesteric liquid crystal is fixed.

Optical measurements on this polymer film show strong selective reflection (the reflectivity 45%) at the peak wavelength of 490 nm and the reflection of the light of left circular polarization. The half-width of the reflection peak is 29 nm.

Next, both polymer films mentioned above are layered with a binding layer. First, a binding agent comprising acrylic monomers which will polymerize on the radiation of ultraviolet rays is painted with a spinner in thickness 2 μm on the first polymer film wherein the dextrorotary cholesteic liquid crystal is fixed. Next, the second polymer film wherein the levorotary cholesteric liquid crystal is fixed is layered on the first polymer film closely. Then, the layered composite is subjected to radiation to ultraviolet rays from above for one minute. Thus, a layered film of two layers is binded.

Optical measurements on this layered film show strong selective reflection (the reflectivity 86%, the transmittance 14%) at the wavelength 490 nm and has the half-width 32 nm of the reflection peak. The transmittance of the light is 83% on the average in the wavelength region outside the selective reflection peak.

It is preferable that the binding agent used in this process has roughly the same refractive index as that of the cholesteric liquid crystal polymer film and contains monomers which affects little the liquid crystal sutructure in the solid polymer film in the binging process.

As explained above, an optical filter according to the present invention has one pair or a plurality of pairs of layered polymer films. Each pair of polymer films consists of a polymer film having dextrorotary cholesteric liquid crystal alignment and satisfies the condition that the products of the helical pitch and the refractive index in both polymer films are equal to each other.

An optical filter of this type has following technical and economical advantages. The wavelength range of the light which an optical filter reflects can be controlled. The optical filter can reflect the light substantially completely in the wavelength range. Thus, the optical filter can be used as a stable light notch filter of light weight. If it is used, for example, for a full color display, the color becomes purer, and the color reproduction range in the CIE chromaticity diagram becomes wide.

Furthermore, the integration of a polymer film mentioned above and a film or a plate used in a display device brings about the lowering of the cost, the improvement of the working efficiency, the reliability and the stability.

While the embodiments of the present invention, as herein disclosed, constitute a prefered form, it is to be understood that other forms might be adopted.

What is claimed is:

1. An optical filter comprising a pair of
   a first solid polymer film having planar alignment of a cholesteric liquid crystal structure of either clockwise or counterclockwise helical structure, which alignment allows the light of a specified wavelength to be scattered selectively, and
   a second solid polymer film having a planar alignment of a cholesteric liquid crystal structure of a helical structure whose helical direction is the opposite to that of the first solid polymer film, which alignment allows the light at the specified wavelength to be scattered selectively; wherein
   the first and second polymer films being layered in close contact with each other, and being layered so that
   the optical axes of the first and second solid polymer films are made substantially parallel to each other.

2. An optical filter according to claim 1, wherein at least two said pairs of solid polymer films are layered so that the optical axes of the solid polymer films are made substantially parallel to each other, and each pair of solid polymer films has a planar alignment which allows the light to be scattered selectively at a specified wavelength different with each other.

3. An optical filter according to claims 1 or 2, wherein the refractive indexes of each solid polymer film which constitutes said pair of solid polymer films are substantially equal to each other.

4. An optical filter according to claims 1 or 2, wherein said cholesteric liquid crystal structure comprises polypeptide compounds.

5. An optical filter according to claims 1 or 2, wherein said cholesteric liquid crystal structure comprises a polymer made by the radiation polymerization from monomers of an acrylic compound having at least one unsaturated radical.

6. A method of preparing an optical filter consisting of a pair of solid polymer films, comprising
   the step of placing a first lyotropic liquid crystal of the cholesteric phase in the planar alignment between two parallel substrates in a uniform thickness, which lyotropic liquid crystal is made of a first mixed solution of polypeptide compounds and monomers which can polymerize under radiation, which cholesteric phase has either a clockwise or counterclockwise helical structure;
   the step of fixing the planar alignment by the radiation polymerization at a predetermined temperature so that a first solid polymer film is produced;
   the step of placing a second lyotropic liquid crystal layer between the first solid polymer film and a substrate which is placed parallel to the first solid polymer film in a uniform thickness of cholesteric phase in the planar alignment, which lyotropic liquid crystal is a second mixed solution of polypeptide compounds and monomers which can polymerize under radiation, which cholesteric phase has a helical structure whose helical direction is the opposite to that in the first solid polymer film; and
   the step of fixing the planar alignment by radiation polymerization at a predetermined temperature so that a second solid polymer film is produced;
   wherein the components and their concentrations in the first and second mixed solutions and the polymerization temperature are determined so that the product of the refractive index and the helical pitch of the cholesteric phase in the first solid polymer film is equal to that in the second solid polymer film and are made substantially parallel to each other.

7. A method of preparing an optical filter according to claim 6, wherein one of said substrates at the outer side is a transparent film or a transparent plate.

8. A method of preparing an optical filter according to claim 6, wherein one of said substrates at the outer side is a color filter or a multicolor filter.

9. A method of preparing an optical filter according to claim 6, wherein one of said substrates at the outer side is a quarter-wavelength plate or a half-wavelength plate.

10. A method of preparing an optical filter according to claim 6, wherein two pairs of solid polymer films are adhered with a binding agent.

11. A method of preparing an optical filter according to claim 6, wherein said binding agent contains monomers which polymerize and hardens under radiation.

12. A method of preparing an optical filter according to claim 6, wherein said polypeptide compound is an acidic polyamino acid or an acidic polyamino acid ester derivative.

13. A method of preparing an optical filter according to claim 6, wherein said monomer is an acrylic compound, a methacrylic compound or an allyl compound.

14. A method of preparing an optical filter consisting of a pair of solid polymer films, comprising the step of placing a lyotropic liquid crystal of a uniform thickness in the cholesteric phase in the planar alignment on a substrate; which lyotropic liquid crystal is made of a first mixed solution of polypeptide compounds and monomers which can polymerize under radiation, which cholesteric phase has either clockwise or counterclockwise helical structure;

the step of fixing the planar alignment by the radiation polymerization at a predetermined temperature so that a first solid polymer film is produced;

the step of placing lyotropic liquid crystal in a uniform thickness in the cholesteric phase on the surface of the first solid polymer film; which lyotropic liquid crystal is made of a second mixed solution of polypeptide compounds and monomers which can polymerize under radiation, which cholesteric phase has a helical structure whoses helical direction is the opposite to that of the second solid polymer film; and the step of fixing the planar alignment by the radiation polymerization at a predetermined temperature so that a second solid polymer film is produced;

wherein the components and their concentrations in the first and the second mixed solutions and the polymerization temperature are determined so that the product of the refractive index and the helical pitch of the cholesteric phase in the first solid polymer film is equal to that in the second solid polymer film.

15. The method of preparing an optical filter according to claim 14, wherein one of said substrates is a transparent film or a transparent plate.

16. A method of preparing an optical filter according to claim 14, wherein one of said substrates is a color filter or a multicolor filter.

17. A method of preparing an optical filter according to claim 14, wherein one of said substrate is a quarter-wavelength plate or a half-wavelength plate.

18. A method of preparing an optical filter according to claim 14, wherein said polypeptide compound is an acidic polyamino acid or an acidic polyamino acid ester derivative.

19. A method of preparing an optical filter according to claim 14, wherein one of said monomers is an acrylic compound, a methacrylic compound or an allyl compound.

20. A method of preparing an optical filter consisting of a pair of solid polymer films, comprising the step of placing a first lyotropic liquid crystal of the cholesteric phase in a planar alignment between two parallel substrates in a uniform thickness, which lyotropic liquid crystal is made of a first mixed solution of polypeptide compounds and monomers which can polymerize under radiation, which cholesteric phase has a clockwise helical structure;

the step of fixing the planar alignment by the radiation polymerization at a predetermined temperature so that a first solid polymer film is produced;

the step of placing a second lyotropic liquid crystal of the cholesteric phase in a planar alignment between two parallel substrates in a uniform thickness, which lyotropic liquid crystal is made of a first mixed solution of polypeptide compounds and monomers which can polymerize under radiation, which cholesteric phase has a counterclockwise helical structure;

the step of fixing the planar alignment by the radiation polymerization at a predetermined temperature so that a second solid polymer film is produced;

the step of binding the first and second solid polymer films with a binding agent of a uniform thickness so as to form layered composite.

21. A method according to claim 20, wherein said binding agent contains monomers which can polymerize under radiation to form a solid binding layer and the step of binding includes a step of radiation polymerization.

* * * * *